Feb. 9, 1932.                H. DOAN                1,844,747
                       FOOT ACCELERATOR GUARD
                         Filed July 30, 1930
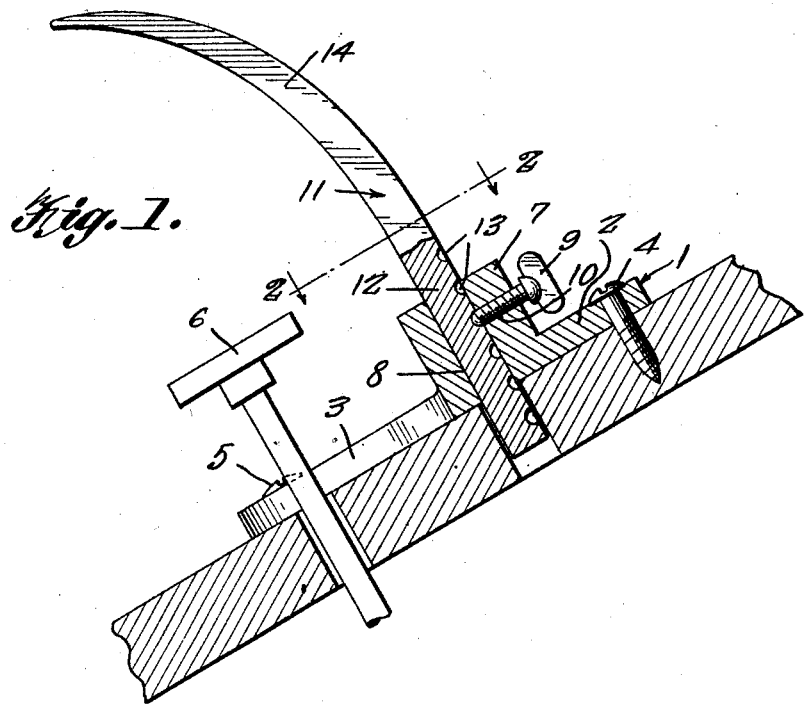
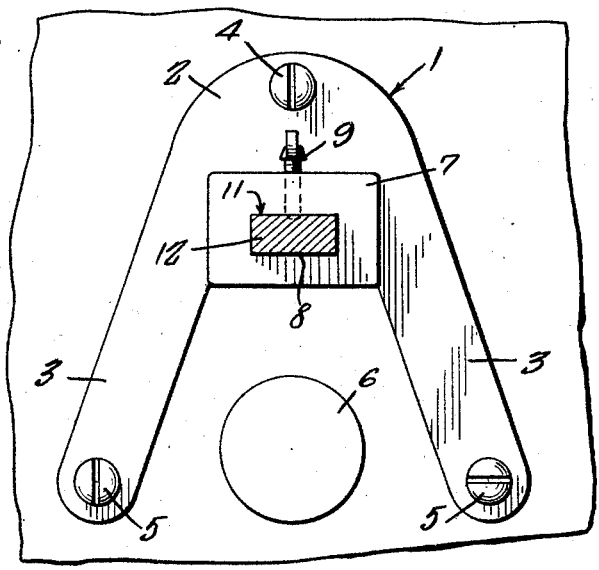
Herman Doan, INVENTOR
BY Victor J. Evans
ATTORNEY
WITNESS:

Patented Feb. 9, 1932

1,844,747

UNITED STATES PATENT OFFICE

HERMAN DOAN, OF WINONA, MICHIGAN

FOOT ACCELERATOR GUARD

Application filed July 30, 1930. Serial No. 471,809.

This invention relates to a foot pedal guard and more particularly to a guard for the accelerator pedal of an automobile, the primary object of the invention being to preclude the likelihood of the driver placing his foot upon the accelerator pedal at the same time he places his foot upon the brake pedal.

Another object of the invention is to provide a device for this purpose which may be readily mounted upon the foot boards of any automobile in juxtaposition to the accelerator pedal and adjusted in acocrdance with the position and upward extension of the pedal so as to best serve its purpose.

This invention also consists in certain other features of construction and in the combination and arrangement of the several parts, to be hereinafter fully described, illustrated in the accompanying drawings, and specifically pointed out in the appended claim, it being understood of course that minor changes may be made so long as they fall within the scope of the claim.

In describing my invention in detail, reference will be had to the accompanying drawings, wherein like characters denote like or corresponding parts throughout the several views, and in which:

Figure 1 is a vertical front to rear sectional view illustrating the guard embodying the invention.

Figure 2 is a horizontal sectional view taken substantially on the line 2—2 of Figure 1, looking in the direction indicated by the arrows.

The device embodying the invention comprises an attaching base 1 having a substantially arcuate head portion 2 and rearwardly diverging arms 3 and this base may be secured to the foot boards of the automobile by screws 4 and 5 fitted through the portions 2 and 3, respectively. When properly positioned the portions 3 are extended at opposite sides of the accelerator pedal 6. The base member 1 is formed upon its upper side with a boss 7 which is preferably of approximately cubical form and this boss is formed with a rectangular slot 8, and a set screw 9 is threaded, adjustably, in an opening 10 formed in the forward side of the boss. The guard proper is indicated in general by the numeral 11 and comprises a shank 12 which is formed with a longitudinal series of sockets 13, and at this point, and by reference to Figure 1 it will be evident that the shank 12 may be adjusted in the slot 8 and secured in its position of adjustment by tightening the set screw 9 so that the inner end of the set screw will engage in one or another of the sockets 13. The guard 11 further comprises an upwardly and rearwardly curving guard portion 14 which is preferably tapered or decreased in thickness in the direction of its upper or rear end, this end extending rearwardly above the accelerator pedal 6 so that it would be practically impossible for the driver of the automobile to place his foot upon the accelerator pedal 6 and likewise, at the same time upon the brake pedal of the automobile.

What I claim is:

A foot accelerator guard comprising a V-shaped base including diverging arm portions arranged at opposite sides of a foot accelerator and an apex portion disposed forwardly of the foot accelerator, means securing the base to the floorboard by said means extending through the apex portion and adjacent the ends of the arm portions, an apertured bearing block formed integral with the base between the arm portions and the apex portion and extending above said base, a shank slidably mounted and adjustably secured in the opening of the bearing block, and an arcuately curved guard formed integral with the shank and extending upwardly and rearwardly over the foot accelerator and tapered toward the free end thereof.

In testimony whereof I affix my signature.

HERMAN DOAN.